W. B. HUTHER.
GRINDING MACHINE.
APPLICATION FILED FEB. 19, 1909.
1,050,464.
Patented Jan. 14, 1913.
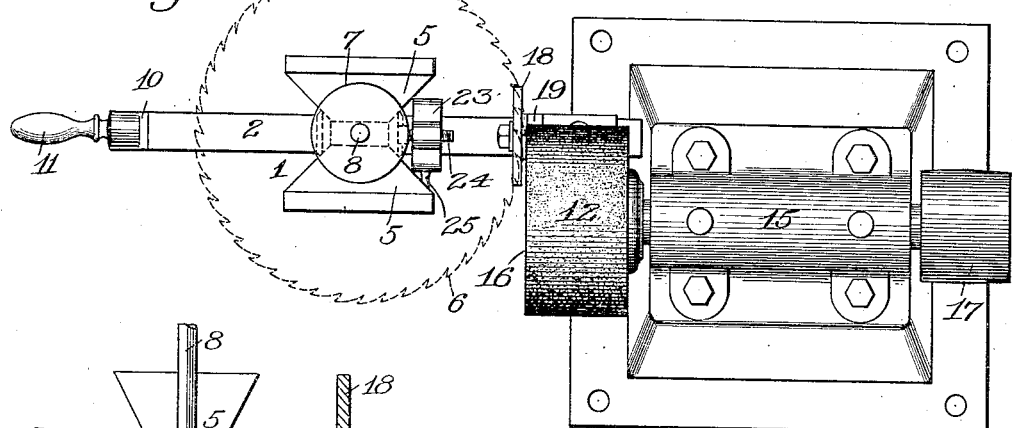
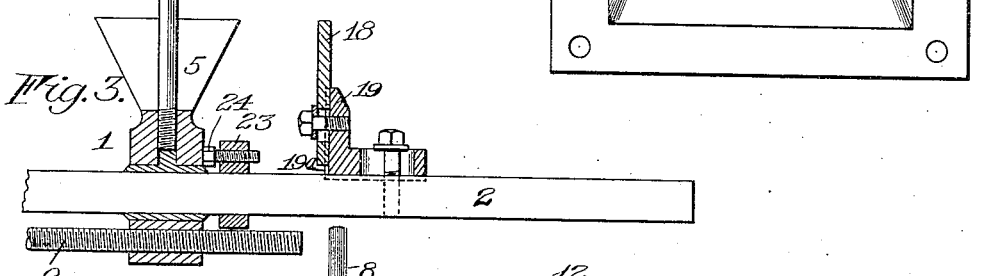
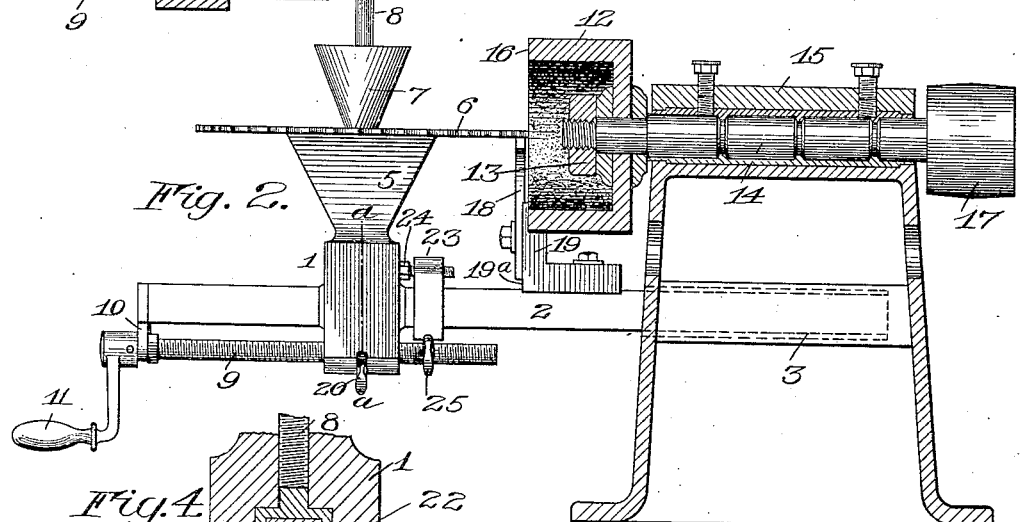
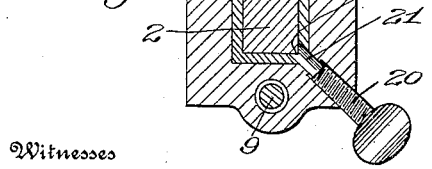
Witnesses
Nelson Copp
H. H. Simms
Inventor
Warren B. Huther
By Church & Rich
his Attorneys
COLUMBIA PLANOGRAPH CO., WASHINGTON, D. C.

UNITED STATES PATENT OFFICE.

WARREN B. HUTHER, OF ROCHESTER, NEW YORK, ASSIGNOR TO HUTHER BROS. SAW MFG. CO., OF ROCHESTER, NEW YORK, A CORPORATION OF NEW YORK.

GRINDING-MACHINE.

1,050,464.  Specification of Letters Patent.  Patented Jan. 14, 1913.

Application filed February 19, 1909. Serial No. 478,831.

*To all whom it may concern:*

Be it known that I, WARREN B. HUTHER, of Rochester, in the county of Monroe and State of New York, have invented certain new and useful Improvements in Grinding-Machines; and I do hereby declare the following to be a full, clear, and exact description of the same, reference being had to the accompanying drawings, forming a part of this specification, and to the reference-numerals marked thereon.

The present invention relates to grinding machines of the type employing a rotary grinder and a suitable support for a saw, disk or other substantially circular body whose periphery is to be ground, and it has for an object to provide a construction in which the grinder operates on the work in such a manner that plane faces are ground.

Another object is to provide a machine of this type which is simple in construction, durable in use and inexpensive to manufacture.

To these and other ends the invention consists in certain improvements and combinations of parts all as will be hereinafter more fully described, the novel features being pointed out in the claims at the end of the specification.

In the drawings: Figure 1 is a plan view of a saw jointing machine constructed in accordance with this invention; Fig. 2 is a side elevation showing the standard in vertical section; Fig. 3 is a longitudinal section of the work support and coöperating parts; and Fig. 4 is a detail vertical section on line *a—a* of Fig. 2.

According to the present invention there may be employed a work support for a circular saw or circular body and a rotary grinder relatively adjustable toward and from each other, the grinder having a plane face operating in a plane substantially tangential to a circular body on the support. In this embodiment the work support 1 is adjustable toward the grinder and for this purpose there may be employed a guide in the form of a bar 2 having angularly arranged faces and fitted and secured within a horizontal pocket 3 that is formed in a cast hollow standard between the top and the bottom of the latter.

The work support may be of any construction but in the present instance it entirely surrounds the bar and has two diverging arms 5 formed at their upper ends with seats for the circular saw or other work piece 6, a conical weight 7 operating on a vertical stem 8 between the arms to center the work. The movement of the work support toward the grinder is preferably effected by a feeding mechanism in the form of a screw 9 extending longitudinally of the guide beneath the same, operating through an internally threaded opening in the holder, and journaled in a bracket 10 depending from the outer end of the guide bar, a crank handle 11 serving to effect its rotation.

The grinder 12 is preferably in the form of a cup in order to require less abrasive material and to house the nut 13 which secures it to one end of its shaft 14. This shaft 14 may be mounted in journal box 15 formed at the upper end of the standard, the shaft being arranged so that the turning axis of the grinder is parallel with the guide bar 2 and in this manner a plane grinding face 16 of the grinder operates in a plane tangential to a circular work piece 6 on the holder. A pulley 17 is arranged on that end of the shaft 14 opposite the grinder and serves to drive the latter and its shaft. While the grinder is operating on a work piece the latter may be sustained at its periphery by a brace 18 which is vertically adjustable on a block 19 that has vertical ways 19$^a$ thereon and is horizontally adjustable on the guide bar 2. A locking device may also be employed for securing the work support against back lash while the work is being operated upon and to this end a set screw 20 operates against a friction piece 21 that engages the guide bar 2 at one corner, the engaging end being notched or grooved at 22 to conform to the corner. This arrangement of the locking device draws two right angularly arranged faces of the support against like faces on the guide bar, thus effectively preventing any movement of the support.

In order to prevent a work piece being fed beyond a certain point which changes with work of different diameters, there may be provided a stop 23 adjustable on the guide bar 2 and carrying a shoulder 24 adapted to coöperate with the work holder, the shoulder being preferably in the form of a screw which permits fine adjustment. A set screw 25 may serve to hold the stop in its adjusted position.

In operation, the work is fitted upon the stem 8 and the centering weight is placed in position to retain it on the support and at the same time to permit its rotation. The stop 23 is then adjusted to correspond with the diameter of the work and the feed screw rotated until the stop is engaged by the holder, being secured in this position by the friction piece 21. The work may now be rotated to bring successive portions of the periphery into engagement with the grinder which is being driven by a belt or the like passing about the pulley 17.

A grinding machine constructed in accordance with this invention will produce teeth with straight edges on a saw of any thickness, and the structure for effecting this result is inexpensive to manufacture, simple in operation and not liable to get out of order.

I claim as my invention:

1. In a saw grinding machine the combination with a frame, a grinder journaled thereon having a flat face, and a guide projecting in front of the grinder at one side of the axis thereof and extending parallel with said axis, of a work support adjustable on said guide relatively to the grinder and a stop on the guide adjustable independently of the support for limiting the movement of the latter in one direction.

2. In a saw grinding machine, the combination with a frame, a cup shaped grinder journaled thereon having its edge lying in a plane at right angles to its axis of rotation, and a guide extending in front of and below the grinder and arranged at one side of and parallel to the axis of the grinder, of a work support extending upwardly from the guide and adapted to hold a work piece horizontally in position to engage the edge of the grinder.

3. The combination with a standard and a guide bar having angularly arranged faces and projecting therefrom, of a grinder mounted on the standard, and a work support movable on the guide bar and carrying a friction piece having a groove to receive a corner formed by two faces on the guide bar.

4. The combination with a standard and a guide extending laterally therefrom, of a grinder mounted on the standard, a work support adjustable on the guide, a block adjustable longitudinally of the guide and having vertical ways thereon, and a brace adjustable on the ways.

5. The combination with a standard and a guide extending laterally therefrom, and a grinder mounted on the standard, of a work support adjustable on the guide, a stop member also adjustable longitudinally of the guide and adapted to be secured in fixed position thereon and a stop screw carried on the stop member and arranged to coöperate with the work support.

WARREN B. HUTHER.

Witnesses:
RUSSELL B. GRIFFITH,
HAROLD H. SIMMS.